United States Patent
Fiske et al.

(10) Patent No.: US 7,636,823 B1
(45) Date of Patent: Dec. 22, 2009

(54) SWITCHING ROLES BETWEEN A PRODUCTION STORAGE DEVICE AND A SNAPSHOT DEVICE

(75) Inventors: Rahul Fiske, Pune (IN); Angshuman Bezbaruah, Pune (IN); Niranjan S. Pendharkar, Maharashtra (IN); Shailesh Vaman Marathe, Maharashtra (IN); Subhojit Roy, Pune (IN)

(73) Assignee: Symantec Corporation, Mountain View, CA (US)

( * ) Notice: Subject to any disclaimer, the term of this patent is extended or adjusted under 35 U.S.C. 154(b) by 429 days.

(21) Appl. No.: 11/535,943

(22) Filed: Sep. 27, 2006

(51) Int. Cl.
  *G06F 13/00* (2006.01)
(52) U.S. Cl. .................... 711/162; 711/154; 711/163
(58) Field of Classification Search ............... 711/162, 711/154, 163
  See application file for complete search history.

(56) References Cited

U.S. PATENT DOCUMENTS

| 6,076,148 | A   | * | 6/2000  | Kedem ................. 711/162 |
| 6,792,518 | B2  | * | 9/2004  | Armangau et al. ......... 711/162 |
| 6,820,099 | B1  | * | 11/2004 | Huber et al. ............. 707/204 |
| 7,433,903 | B1  | * | 10/2008 | Shapiro et al. ........... 707/204 |
| 2005/0223180 | A1 | * | 10/2005 | Derbeko ................. 711/162 |
| 2006/0212481 | A1 | * | 9/2006  | Stacey et al. ............ 707/104.1 |

* cited by examiner

*Primary Examiner*—Reba I Elmore
(74) *Attorney, Agent, or Firm*—Brill Law Office; Jeffrey Brill

(57) ABSTRACT

A snapshot manager switches the roles of a production storage device and a corresponding snapshot device by modifying read and write requests to the devices. Thus, translation mapping information concerning the acting snapshot device does not change, so a remote computing device can perform a backup from the acting snapshot without having to restart every time content is written to the production device. After the backup operation, the snapshot manager can update the underlying data source from the acting production device to capture writes to production that occurred during the backup. The snapshot manager then reverts the roles of the storage device and the snapshot to normal.

20 Claims, 1 Drawing Sheet

SWITCHING ROLES BETWEEN A PRODUCTION STORAGE DEVICE AND A SNAPSHOT DEVICE

TECHNICAL FIELD

This invention pertains generally to backing-up computer storage, and more specifically to improving backup performance by eliminating mapping changes to snapshot devices.

BACKGROUND

Typically, in order to backup data on a production storage device, a copy or snapshot of the production device is taken, and the backup is made from this snapshot. This allows the production device to remain active during the backup operation. In order to execute such a back-up operation, a copy-on-write snapshot is often used. A copy-on-write snapshot initially comprises file system location information of the files on the underlying storage device, but not the actual files themselves. Thus, initially no actual copy of the data on the production storage device is created, thereby saving storage space and computing resources. However, if a user attempts to modify (e.g., write to) the snapshot, a snapshot copy of the target data is made, and then modified by the user operation. Thus, only the snapshot copy is updated, but the underlying production device is not. On the other hand, when a user writes to the production device, the original target data on the production device is first copied to the snapshot, such that the snapshot now includes a copy of the data prior to the write operation. The write operation to the production device then occurs. Thus, updates to the production device do not modify the snapshot, only the production device.

Backup operations are often performed "off-host" (i.e., where the actual backup is performed by a computing device other than the one associated with the storage device being backed-up). This frees up the resources of the primary computing device that would otherwise be devoted to the backup operation. A remote computing device performing a backup from a snapshot does not have internal access to the file system of the computing device being backed-up. Therefore, the remote computing device needs access not only to the snapshot itself, but it also needs the direct translations between the snapshot and the underlying physical storage device, so that it can access the actual files. For off-host backups, a file mapping methodology is used to create this mapping information between the snapshot and the underlying storage device. The snapshot and these physical storage mappings are transferred to the computing device which is to perform the backup, such that it can directly access the underlying storage device.

However, where a copy-on-write snapshot is used for an off-host backup operation, every write operation to the production device during the backup operation results in changes to the translation mappings of the snapshot device. Any such changes occurring during the backup require translation mappings to be refreshed at the backup host. That of course means that the backup will need to be restarted for that snapshot every time a write operation occurs during the backup operation. Such write operations can be frequent. This makes the backup operation both time and resource intensive, thereby prolonging the backup cycle.

What is needed are methods, computer readable media and computer systems for enabling off-host backup from a copy-on-write snapshot, without the problems described above.

SUMMARY OF INVENTION

The roles of a storage device and a snapshot copy of the storage device are switched, so that the storage device can be backed-up without having to start over every time a change is made to the storage device during the backup. More specifically, read and write requests to the production storage device and the snapshot are modified so that the snapshot device acts as the production storage device and vice versa. Thus, translation mapping information concerning the acting snapshot device (the underlying data source) does not change, so a remote computing device can perform a backup from the acting snapshot without having to restart every time content is written to the production storage device. After the backup operation is complete, the underlying data source can be updated from the acting production device to capture writes to the production device that occurred during the backup. Then, the roles of the storage device and the snapshot copy are reverted to normal.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
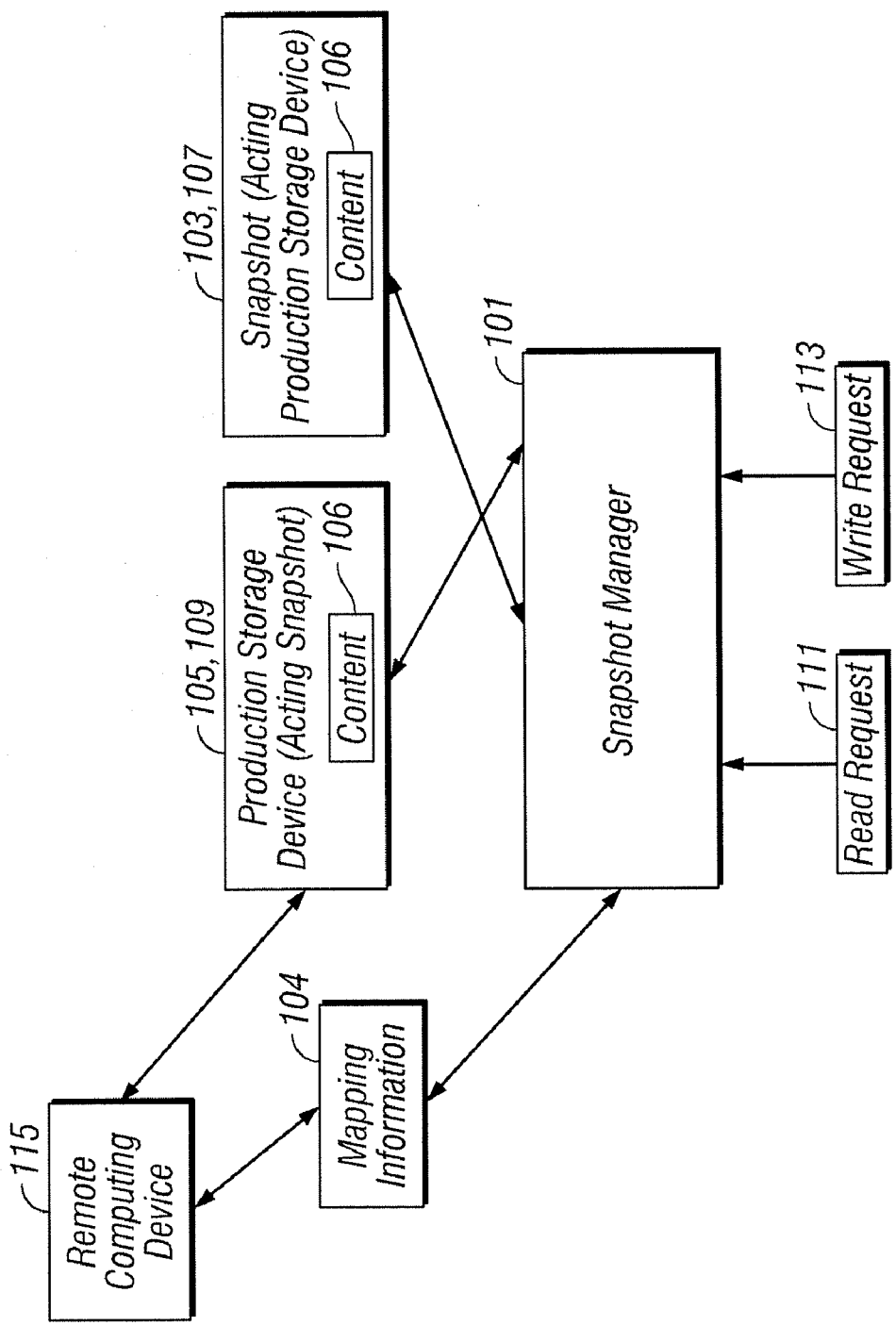
FIG. 1 is a block diagram illustrating a snapshot manager eliminating translation mapping changes to snapshot devices, according to some embodiments of the present invention.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a snapshot manager 101, according to some embodiments of the present invention. It is to be understood that although the snapshot manager 101 is illustrated as a single entity, as the term is used herein a snapshot manager 101 refers to a collection of functionalities which can be implemented as software, hardware, firmware or any combination of these. Where a snapshot manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the snapshot manager 101 modifies the way copy-on-write snapshots 103 are configured and utilized, so as to avoid changes to the translation mappings 104 of the snapshot device 103 while a backup or other off-host procedure is ongoing. Although this specification discusses using the snapshot 103 modifications described herein for the facilitation of off-host backups, it will be apparent to those of ordinary skill in the relevant art in light of this specification that such methodology can be used for other off-host storage device processing as well, such as a scan of the storage device for malicious code (e.g., an anti-virus scan).

Before the backup is started but after the creation of the copy-on-write snapshot 103, the snapshot manager 101 rearranges the underlying roles of the original production device 105 and the snapshot 103. The snapshot manager 101 switches these roles such that the newly added snapshot 103 acts as the production device 105 and vice versa. For clarity, the newly added copy-on-write snapshot 103 will be referred to as the acting production device 107 and the original production device 105 as the acting snapshot 109. As per the role switch, the acting snapshot 109 becomes the data source for the acting production device 107.

The snapshot manager 101 subsequently processes I/O (input/output) requests to the respective devices as follows. When a read request 111 attempts to read from the production device 105, the request 111 is routed to the acting snapshot device 109, which is in fact the underlying data source as explained above. When a write request 113 attempts to write to the production device 105, the content 106 that will be affected by the write is read from the acting snapshot 109 and written to the acting production device 107. The write request 113 is then routed to the acting production device 107. Thus, the write is executed on the acting production device 107, and the underlying data source (the acting snapshot 109) is not affected.

Read requests 111 targeting the snapshot 109 are not rerouted (i.e., they read directly from the acting snapshot 109). Responsive to a write request 113 targeting the snapshot 109, first the content 106 to be affected by the write is copied from the data source to the acting production device 107, followed by a direct write to the acting snapshot 109.

The acting snapshot 109 and the relevant mapping information 104 are made available to the off-host computing device 115 to execute the backup operation. As all of the underlying stored content is already on the acting snapshot 109 (which is in fact the underlying data source), the mapping information 104 does not change during the backup, and consequently the backup does not need to be restarted.

As the techniques described herein eliminate changes to mapping information 104 during backups, the backup window is significantly reduced. The off-host computing device 115 can access the acting snapshot device 109 directly, and make a backup. Since the mapping information 104 of the acting snapshot 109 does not change, the off-site computing device 115 need not request or receive modified mappings 104. The backup cycle can thus be finished without interruption, greatly increasing performance. Ensuring that the backup process does not get interrupted also has the benefit that tape performance can be increased due to continuous data streaming to the tape(s).

If the configuration of the original production device 105 (the underlying storage device) and the newly allocated storage (the actual snapshot 103, which functions as the acting production device 107 during the backup) do not match, the redundancy and/or performance characteristics of the acting production device 107 might be relatively deficient during the backup window. However, this should not be a matter of concern because this change is only for a temporary duration, i.e. until the backup completes. In any case, it can be easily ensured that the allocated storage for the acting production device 107 meets some minimal (or specified) redundancy and/or performance characteristics.

Once the backup cycle is complete, the snapshot manager 101 can refresh the acting snapshot 109 from the acting production device 107 to capture any updates that occurred to the acting production device 107 during the backup. The snapshot manager 101 can then undo the switch between the devices, restoring the underlying data source to its role as the production device 105. Of course, without switching back the device roles, any writes 113 targeting the production device 105 during the backup cycle do not get written to actual production device storage 105, as during the backup such writes 113 are routed to the acting production device 107, which is the recently created snapshot 103.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where components of the present are implemented in whole or in part in software, the software components thereof can be stored as program code (for example as object code or executable images) on computer readable storage media as computer program products (articles of manufacture). As will be readily apparent to those of ordinary skill in the relevant art, any form of tangible computer readable storage medium can be used in this context, such as magnetic or optical storage media. Additionally, it will be readily apparent to those of ordinary skill in the relevant art that software components of the present invention can be instantiated as program code within the memory of any computing device, such that when the processor of the computing device processes the components, the computing device executes their associated functionality. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for improving performance of storage device operations, the method comprising the steps of:

switching roles of an underlying production storage device and a created snapshot device, such that the production storage device is used as the snapshot device and the snapshot device is used as the production storage device, by performing, by a computer, at least one of the following modifications to input/output requests to the production storage device and to the created snapshot device:
responsive to receiving a request to write new content to the production storage device, modifying the received write request by 1) copying affected old content from the production storage device to the snapshot device, and 2) writing the new content to the snapshot device instead of to the production storage device;
responsive to receiving a request to read content from the snapshot device, modifying the received read request by reading the content from the production storage device instead of to the snapshot device; and
responsive to receiving a request to write new content to the snapshot device, modifying the received write request by 1) copying affected old content from the production storage device to the snapshot device, and 2) writing the new content to the production storage device instead of to the snapshot device.

2. The method of claim 1 further comprising:
receiving, by a computer, a request from a remote computing device to perform a storage device operation; and
in response to receiving the request, performing, by a computer, the switching step.

3. The method of claim 2 wherein receiving, by a computer, a request from a remote computing device to perform a storage device operation further comprises receiving, by a computer, a request from a group of requests consisting of:
a request to perform a backup; and
a request to perform an anti-malicious code scan.

4. The method of claim 1 further comprising:
making the underlying production storage device, the role of which has been switched with the created snapshot device, available to a remote computing device to perform a storage device operation, by a computer; and
making mapping information concerning the underlying production storage device, the role of which has been switched with the created snapshot device, available to the remote computing device to perform a storage device operation, by a computer.

5. The method of claim 1 further comprising:
receiving, by a computer, an indication from a remote computing device that it has completed performing a storage device operation;
copying, by a computer, updated contents on the snapshot device to the production storage device; and
reinstating, by a computer, the roles of the production storage device and the snapshot device by no longer modifying input/output requests to the production storage device and the snapshot device.

6. The method of claim 1 further comprising:
creating the snapshot device, by a computer.

7. The method of claim 6 wherein creating the snapshot device further comprises:
creating a copy-on-write snapshot, by a computer.

8. The method of claim 6 creating the snapshot device further comprises:
creating the snapshot device to meet a level of performance of the production storage device, by a computer.

9. At least one computer readable storage medium containing a computer program product for improving performance of storage device operations, the computer program product comprising:
program code for switching roles of an underlying production storage device and a created snapshot, such that the production storage device is used as the snapshot and the snapshot is used as the production storage device, by treating input/output requests to the production storage device and the created snapshot as follows:
responsive to receiving a request to write new content to the production storage device, modifying the received write request by 1) copying affected old content from the production storage device to the snapshot, and 2) writing the new content to the snapshot instead of to the production storage device;
responsive to receiving a request to read content from the snapshot, modifying the received read request by reading the content from the production storage device instead of to the snapshot; and
responsive to receiving a request to write new content to the snapshot, modifying the received write request by 1) copying affected old content from the production storage device to the snapshot, and 2) writing the new content to the production storage device instead of to the snapshot.

10. The computer program product of claim 9 further comprising:
program code for receiving a request from a remote computing device to perform a storage device operation; and
program code for performing the switching step in response to receiving the request.

11. The computer program product of claim 10 wherein the program code for receiving a request from a remote computing device to perform a storage device operation further comprises program code for receiving a request from a group of requests consisting of:
a request to perform a backup; and
a request to perform an anti-malicious code scan.

12. The computer program product of claim 9 further comprising:
program code for making the underlying production storage device, the role of which has been switched with the created snapshot, available to a remote computing device to perform a storage device operation; and
program code for making mapping information concerning the underlying production storage device, the role of which has been switched with the created snapshot, available to the remote computing device to perform a storage device operation.

13. The computer program product of claim 9 further comprising:
program code for receiving an indication from a remote computing device that it has completed performing a storage device operation;
program code for copying updated contents on the snapshot to the production storage device; and
program code for reinstating the roles of the production storage device and the snapshot by no longer modifying input/output requests to the production storage device and the snapshot.

14. The computer program product of claim 9 further comprising:
program code for creating the snapshot.

15. The computer program product of claim 14 wherein the program for creating the snapshot further comprises:
program code for creating a copy-on-write snapshot.

16. The computer program product of claim 14 wherein the program for creating the snapshot further comprises:
program code for creating the snapshot to meet a level of performance of the production storage device.

17. A computer system for improving performance of storage device operations, the computer system comprising:
a portion configured to switch roles of an underlying production storage device and a created snapshot, such that the production storage device is used as the snapshot and the snapshot is used as the production storage device, by treating input/output requests to the production storage device and the created snapshot as follows:

responsive to receiving a request to write new content to the production storage device, modifying the received write request by 1) copying affected old content from the production storage device to the snapshot, and 2) writing the new content to the snapshot instead of to the production storage device;

responsive to receiving a request to read content from the snapshot, modifying the received read request by reading the content from the production storage device instead of to the snapshot; and responsive to receiving a request to write new content to the snapshot, modifying the received write request by 1) copying affected old content from the production storage device to the snapshot, and 2) writing the new content to the production storage device instead of to the snapshot.

18. The computer system of claim 17 further comprising:

a portion configured to receive a request from a remote computing device to perform a storage device operation; and wherein the switching portion is further configured to perform the switch in response to receiving the request.

19. The computer system of claim 17 further comprising:

a portion configured to make the underlying production storage device, the role of which has been switched with the created snapshot, available to a remote computing device to perform a storage device operation; and a portion configured to make mapping information concerning the underlying production storage device, the role of which has been switched with the created snapshot, available to the remote computing device to perform a storage device operation.

20. The computer system of claim 17 further comprising:

a portion configured to receive an indication from a remote computing device that it has completed performing a storage device operation;

a portion configured to copy updated contents on the snapshot to the production storage device; and a portion configured to reinstate the roles of the production storage device and the snapshot by no longer modifying input/output requests to the production storage device and the snapshot.

\* \* \* \* \*